United States Patent
Murata et al.

(10) Patent No.: US 9,017,616 B2
(45) Date of Patent: Apr. 28, 2015

(54) CATALYTIC CONVERTER

(75) Inventors: Toshio Murata, Toyota (JP); Hideyuki Kohmitsu, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 85 days.

(21) Appl. No.: 13/990,195

(22) PCT Filed: Dec. 21, 2010

(86) PCT No.: PCT/JP2010/073034
§ 371 (c)(1),
(2), (4) Date: May 29, 2013

(87) PCT Pub. No.: WO2012/086013
PCT Pub. Date: Jun. 28, 2012

(65) Prior Publication Data
US 2013/0259754 A1 Oct. 3, 2013

(51) Int. Cl.
*B01D 50/00* (2006.01)
*B01D 53/34* (2006.01)
*F01N 3/20* (2006.01)
*F01N 13/14* (2010.01)
*F01N 3/28* (2006.01)
*F01N 9/00* (2006.01)

(52) U.S. Cl.
CPC ............ *B01D 53/346* (2013.01); *F01N 3/2026* (2013.01); *F01N 13/14* (2013.01); *Y02T 10/26* (2013.01); *F01N 3/2853* (2013.01); *F01N 9/00* (2013.01); *F01N 2900/1602* (2013.01); *Y02T 10/47* (2013.01)

(58) Field of Classification Search
CPC . F01N 2900/1602; F01N 3/2853; F01N 9/00; Y02T 10/47
USPC .................................. 422/117, 177, 180, 174
See application file for complete search history.

(56) References Cited

U.S. PATENT DOCUMENTS

| 5,170,624 | A | * | 12/1992 | Cornelison et al. | ............. | 60/300 |
| 5,384,099 | A | * | 1/1995 | Sheller | ........................... | 422/174 |
| 5,525,309 | A | * | 6/1996 | Breuer et al. | ................. | 422/174 |
| 6,176,081 | B1 | | 1/2001 | Shimasaki et al. | | |

FOREIGN PATENT DOCUMENTS

| JP | U-6-47625 | 6/1994 |
| JP | H10-184345 A | 7/1998 |
| JP | A-11-257058 | 9/1999 |
| JP | A-2012-112302 | 6/2012 |
| KR | A-2003-0032106 | 4/2003 |

OTHER PUBLICATIONS

Jul. 11, 2014 Korean Office Action issued in Korean Application No. 2013-7016816 (with translation).

* cited by examiner

*Primary Examiner* — Tom P Duong
(74) *Attorney, Agent, or Firm* — Oliff PLC

(57) ABSTRACT

A catalytic converter is obtained that can suppress deterioration in insulating ability between electrode members that is caused by moisture within exhaust. Insulating layers are provided at peripheries of electrode rods that are for energizing a catalyst carrier, and the electrode rods are insulated from a case tube. The catalyst carrier is structured of a material whose temperature rises due to application of voltage. Temperatures of the insulating layers are raised by applying voltage from a power supply to the catalyst carrier.

6 Claims, 7 Drawing Sheets ured to be applied to the

CATALYTIC CONVERTER

TECHNICAL FIELD

The present invention relates to a catalytic converter that is provided at the exhaust pipe of an internal combustion engine.

BACKGROUND ART

In a catalytic converter that is provided at an exhaust pipe in order to purify the exhaust generated at an internal combustion engine, there is a structure in which a catalyst carrier (a honeycomb structure) that carries a catalyst is energized and the temperature thereof raised such that a good catalyst effect is obtained even when the engine is cold or the like, as is disclosed in Japanese Patent Application Laid-Open No. 11-257058 (Patent Document 1) for example.

By the way, in the structure disclosed in Patent Document 1, the surfaces of electrode rods that are for energizing the honeycomb structure are subjected to insulating coating so as to prevent deterioration of the insulating ability.

However, when moisture (water vapor) or the like within the exhaust condenses on the surface of an insulating body, the electrodes and the case are short-circuited due to this moisture (liquid). Therefore, there is the concern that the insulating ability between the electrodes will deteriorate and the efficiency of supplying electricity to the catalyst carrier also will deteriorate.

DISCLOSURE OF INVENTION

Technical Problem

In consideration of the above-described circumstances, the topic of the present invention is to obtain a catalytic converter than can suppress a deterioration in the insulating ability between electrode members that is due to moisture within exhaust.

Solution to Problem

The present invention has: a case tube that is mounted to an exhaust pipe and through an interior of which exhaust flows; a catalyst carrier that is provided at the case tube, and that carries a catalyst for purifying exhaust that is exhausted from an engine, and that is heated by energization; a pair of electrode members that pass-through the case tube, are made to contact the catalyst carrier, and are for energizing the catalyst carrier; an insulating member that is disposed between the case tube and at least one of the electrode members, and that insulates the electrode member from the case tube, and that generates heat due to application of voltage; and a control device that controls energizing of the catalyst carrier and application of voltage to the insulating member.

In this catalytic converter, when the catalyst carrier is energized through the electrode members and is heated and the temperature thereof is raised, the purifying effect of the catalyst that is carried by the catalyst carrier can be exhibited earlier. Further, the insulating member is disposed between the case tube and at least one of the electrode members, and the electrode members are insulated from the case tube by this insulating member. Therefore, the two electrode members being short-circuited via the case tube is prevented, and efficient supply of electricity to the catalyst carrier is possible.

There are cases in which vapor (moisture of a gas), that is generated by combustion of the internal combustion engine, is contained within the exhaust. There are cases in which the temperature of the insulating member is low, in particular immediately after start-up of the engine and the like, and there is the concern that this vapor will condense when contacting the surface of the insulating member.

The insulating member has an insulating ability to the extent that the electrode members and the case tube can be electrically insulated, but generates heat when voltage is applied thereto. Further, due to voltage being applied to the insulating member by the control device, the insulating member can be made to generate heat and the temperature thereof can be raised. Due thereto, condensation on the surface of the insulating member can be suppressed. Further, the evaporation of moisture that has adhered to the surface of the insulating member is promoted. Further, short-circuiting of the electrode members and the case tube due to the adhering of moisture to the insulating member is prevented. Because a deterioration in the insulating ability between the electrode members also is suppressed, a deterioration in the efficiency of supplying electricity to the catalyst carrier can be suppressed.

In the present invention, the control device may be structured so as to apply voltage to the insulating member before energizing of the catalyst carrier.

Namely, in a case in which voltage is applied to the insulating member after the energizing of the catalyst carrier, there are cases in which, during the time from the energizing of the catalyst carrier to the application of voltage to the insulating member, the catalyst carrier is energized in a state in which the electrical resistance of the insulating member has decreased. However, by applying voltage to the insulating member before the energizing of the catalyst carrier, the time over which the catalyst carrier is energized in a state in which the electrical resistance of the insulating member has decreased is shortened (preferably, this time is eliminated), and therefore, a deterioration in the efficiency of supplying electricity to the catalyst carrier can be suppressed.

Note that the application of voltage to the insulating member may be simultaneous with the energizing of the catalyst carrier, but is preferably carried out before the energizing of the catalyst carrier.

The present invention may be structured to have a temperature detecting device for detecting a temperature of the catalyst carrier, wherein the control device carries out application of voltage to the insulating member and energizing of the catalyst carrier, in a case in which the temperature of the catalyst carrier detected by the temperature detecting device is less than or equal to a predetermined temperature.

Accordingly, by making it such that application of voltage to the insulating member and energizing of the catalyst carrier are not carried out in a case in which the temperature of the catalyst carrier exceeds a predetermined temperature, efficient application of voltage to the insulating member and efficient energizing of the catalyst carrier are possible.

The present invention may be structured to have an electrical resistance detecting device for detecting electrical resistance of the insulating member, wherein the control device applies voltage to the insulating member, in a case in which the electrical resistance of the insulating member detected by the electrical resistance detecting device is less than or equal to a predetermined value.

In this way, the electrical resistance of the insulating member is detected by the electrical resistance detecting device. By applying voltage to the insulating member in a case in which this electrical resistance is less than or equal to a predetermined value, voltage is not applied to the insulating member in a case in which the electrical resistance of the insulating member exceeds the predetermined value. Therefore, efficient application of voltage to the insulating member is possible.

In the present invention, further, the control device may be structured to carry out energizing of the catalyst carrier in a case in which the electrical resistance of the insulating member exceeds a predetermined value.

In this way, by carrying out energizing of the electrode members in a case in which the electrical resistance of the insulating member exceeds a predetermined value, a situation in which the catalyst carrier is energized in a case in which the electrical resistance of the insulating member is less than or equal to the predetermined value is prevented, and the catalyst carrier can be heated efficiently.

The present invention may be structured to further have a temperature detecting device for detecting a temperature of the catalyst carrier, wherein, in a case in which the electrical resistance of the insulating member is less than or equal to a predetermined value, the control device carries out application of voltage to the insulating member, and, after the electrical resistance exceeds the predetermined value, the control device carries out energizing of the catalyst carrier in a case in which the temperature of the catalyst carrier detected by the temperature detecting device is less than or equal to a predetermined temperature.

Namely, in a case in which the electrical resistance of the insulating member is less than or equal to a predetermined value, first, application of voltage to the insulating member is carried out. Then, after the electrical resistance of the insulating member exceeds the predetermined value, energizing of the catalyst carrier is carried out in a case in which the temperature of the catalyst carrier becomes less than or equal to a predetermined temperature. Due thereto, the catalyst carrier can be heated even more efficiently.

Advantageous Effects of Invention

Because the present invention is structured as described above, deterioration in the insulating ability between electrode members due to moisture within exhaust can be suppressed.

BEST MODES FOR CARRYING OUT THE INVENTION

Figure 1:
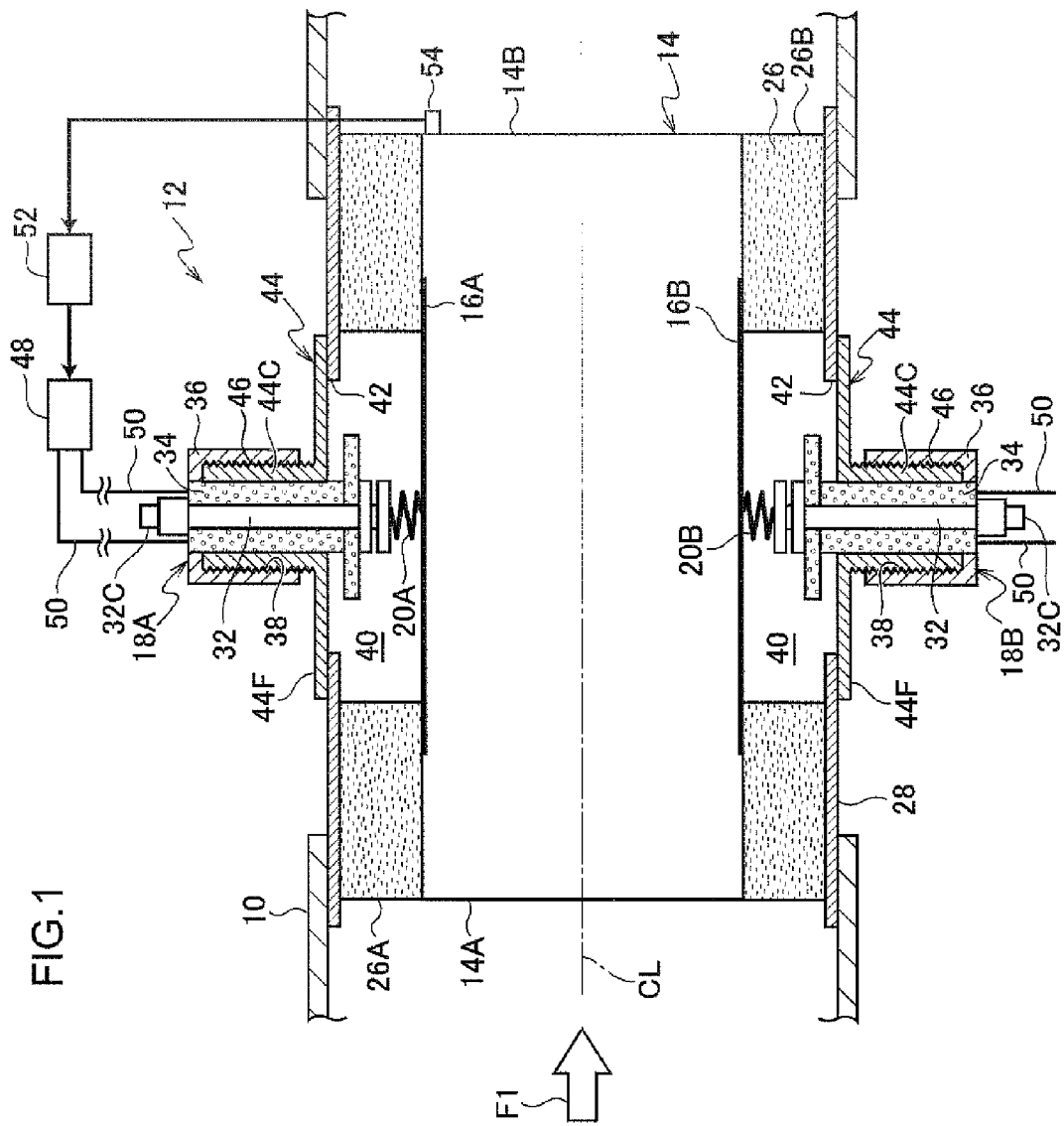
FIG. 1 is a cross-sectional view showing the schematic structure of an exhaust device for a vehicle of a first embodiment of the present invention, in a state of being mounted to an exhaust pipe, in a cross-section that includes a central line.

A state in which a catalytic converter 12 of a first embodiment of the present invention is installed at an exhaust pipe 10 is shown in FIG. 1. This catalytic converter 12 can be applied to both an automobile that obtains driving force by an engine only (hereinafter called "engine car"), and to an automobile that obtains driving force from a combination of an engine and a motor (hereinafter called "hybrid car").

As shown in FIG. 1, the catalytic converter 12 has a catalyst carrier 14 that is formed by a material that is electroconductive and rigid (an electroconductive ceramic, an electroconductive resin, a metal or the like can be used, but, in the present embodiment, an electroconductive ceramic in particular is used). The catalyst carrier 14 is formed in the shape of a solid cylinder or a cylindrical tube at which the surface area of the material is enlarged, by a thin plate, that is honeycomb-shaped or wave-shaped or the like, being structured into a spiral shape or a concentric circle shape or the like, and a catalyst (platinum, palladium, rhodium, or the like) is carried in a state of being adhered to the surface. The catalyst has the action of purifying harmful substances within the exhaust (whose flowing direction is shown by arrow F1) that flows within the exhaust pipe 10. Note that the structure that enlarges the surface area of the catalyst carrier 14 is not limited to the aforementioned honeycomb shape or wave shape.

Two electrode plates 16A, 16B are affixed to the catalyst carrier 14, and further, terminals 18A, 18B are connected to the electrode plates 16A, 16B respectively via conductor members 20A, 20B that are formed of an electroconductive material such as a metal or the like. Both of the terminals 18A, 18B are a structure in which an insulating layer 34 covers the periphery of an electrode rod 32 at the center. The outer side end portions of the electrode rods 32 (the end portions at the sides opposite the conductor members 20A, 20B) are made to be connection portions 32C to which cables for the supply of electricity to the catalyst carrier 14 are connected. The electrode rods 32 structure the electrode members of the present invention.

The conductor members 20A, 20B are flexible and are formed in, for example, zigzag shapes or helix shapes. In a case in which a case tube 28 and the catalyst carrier 14 move relatively as is described later, the conductor members 20A, 20B can absorb this relative movement. Further, the catalyst carrier 14 can be heated by energizing the catalyst carrier 14 from the terminals 18A, 18B through the conductor members 20A, 20B and the electrode plates 16A, 16B. Due to the temperature of the catalyst, that is carried on the surface, rising due to this heating, the purifying action of the catalyst can be exhibited at an early stage, even immediately after start-up of the engine or the like.

The insulating layer 34 is formed in a cylindrical tube shape of an electrically insulating material, and, by covering the outer peripheral surface of the electrode rod 32 over the entire periphery thereof, obstructs the flow of electricity from the electrode rod 32 to an electrode-mounting cover 36 (described in detail later).

The periphery of the insulating layer 34 is covered by the electrode-mounting cover 36. The electrode-mounting cover 36 is formed in a cylindrical tube shape having a predetermined rigidity by being made of metal. A female screw 38 is formed at the inner peripheral surface of the electrode-mounting cover 36.

A holding member 26, that is formed in a substantially cylindrical tube shape of an insulating material, is disposed at the outer periphery of the catalyst carrier 14. Further, the case tube 28, that is molded in a substantially cylindrical tube shape of a metal such as stainless or the like, is disposed at the outer periphery of the holding member 26. In other words, the catalyst carrier 14 is accommodated at the interior of the case tube 28 that is substantially cylindrical tube shaped, and the catalyst carrier 14 is held concentrically (central line CL) at the interior of the case tube 28 by the holding member 26 that is disposed between the case tube 28 and the catalyst carrier 14. Further, because the holding member 26 that is insulating is disposed between the catalyst carrier 14 and the case tube 28, the flow of electricity from the catalyst carrier 14 to the case tube 28 is impeded.

The holding member 26 also has a predetermined elasticity. Because the linear expansion coefficients of the case tube 28 that is formed of metal and the catalyst carrier 14 that is formed of an electroconductive ceramic are different, the expansion amounts thereof, due to the heat of the exhaust that passes through the exhaust pipe 10 interior and the heating due to energization of the catalyst carrier 14, are different, but the difference between these expansion amounts is absorbed by the elasticity of the holding member 26. Moreover, also with respect to the input of vibrations that pass through the exhaust pipe 10, the holding member 26 absorbs the positional offset between the case tube 28 and the catalyst carrier 14, while exhibiting a damping effect. Note that the material of the holding member 26 is not limited provided that it is insulating and elastic as described above, but, as examples of the material, fiber mat is preferable, and, in addition thereto, Intaram mat, mullite, and the like also can be used.

Further, as can be understood from FIG. 1, when viewing the holding member 26 as a whole, the catalyst carrier 14 and the holding member 26 are formed to approximately the same length in the axial direction, and an upstream side end surface 14A of the catalyst carrier 14 and an upstream side end surface 26A of the holding member 26 are substantially flush. Similarly, a downstream side end surface 14B of the catalyst carrier 14 and a downstream side end surface 26B of the holding member 26 are substantially flush.

Electrode chambers 40 at two places are formed in the holding member 26 at predetermined positions of the axial direction center. The conductor members 20A, 20B and the distal end portions of the terminals 18A, 18B are accommodated in these electrode chambers 40.

Mounting holes 42 are formed in the case tube 28 at positions corresponding to the electrode chambers 40. Electrode-mounting bosses 44 are fixed to the case tube 28, in correspondence with the mounting holes 42. Insert-through holes, through which the distal end portions of the terminals 18A, 18B are inserted, are formed in the electrode-mounting bosses 44, and the electrode mounting bosses 44 have cover plate portions 44F that cover the mounting holes 42, and cylindrical tube portions 44C that are cylindrical tube shaped and stand from the centers of the cover plate portions 44F.

Male screws 46, with which the female screws 38 are screwed-together, are formed at the inner peripheral surfaces of the cylindrical tube portions 44C. The terminals 18A, 18B are mounted to the electrode-mounting bosses 44 due to the female screws 38 of the electrode-mounting covers 36 being screwed together with the male screws 46 of the cylindrical tube portions 44C in a state in which the electrode-mounting bosses 44 are fixed to the case tube 28.

Lead lines 50 for applying voltage from a power supply 48 are connected to the insulating layers 34. The insulating layers 34 are structured from a material that, in the usual state, has an insulating ability (electrical resistance) that is sufficient in order to insulate the electrode rods 32 with respect to the case tube 28 as described above, but at which, when sufficiently high voltage is applied, Joule heat is generated and the temperature rises. As this material, for example, alumina, silicon nitride, and the like can be given as examples. At the time of molding these materials, by forming them in a porous shape having a predetermined void rate, the desired insulating ability, and heat generating ability at the time of application of voltage, can be fulfilled.

The power supply 48 is controlled by a control device 52. Note that, as the power supply 48, a power supply for applying voltage to the insulating layers 34 may be newly provided, but, for example, the battery that is installed in the vehicle can be used.

A temperature sensor 54 that detects the temperature of the catalyst carrier 14 is mounted to the catalyst carrier 14. The data of the temperature of the catalyst carrier 14, that is detected at the temperature sensor 54, is sent to the control device 52.

Operation of the catalytic converter 12 of the present embodiment is described next.

As can be understood from FIG. 1, at the interior of the exhaust pipe 10, the exhaust from the engine first passes through the catalytic converter 12, and due thereto, harmful substances within the exhaust within the exhaust are purified. In particular, in the catalytic converter 12 of the present embodiment, due to the catalyst carrier 14 being energized from the terminals 18A, 18B (the electrode rods 32) through the electrode plates 16A, 16B, and the catalyst carrier 14 being heated, the temperature of the catalyst itself that is carried by the catalyst carrier 14 is raised, and the purifying action can be exhibited earlier. For example, in a case in which the temperature of the exhaust is low such as immediately after the start-up of the engine or the like, the purifying performance of the catalyst itself in the initial stage of engine start-up can be ensured to be high by actively carrying out heating by energization of the catalyst carrier 14 in advance. Note that, in a case in which the temperature of the exhaust is sufficiently high, the temperature of the catalyst carrier 14 is raised by the heat from the exhaust, and therefore, there is no need to energize the catalyst carrier 14.

Because moisture is contained within the exhaust, there are cases in which the exhaust that contains this moisture passes through the holding member 26 or the catalyst carrier 14 and enters into the electrode chambers 40. Moreover, there is the concern that, within the electrode chambers 40, this moisture will condense and liquefy at the surfaces of the insulating layers 34. Immediately after engine start-up in particular, the temperatures of the insulating layers 34 also are low, and therefore, it is easy for the moisture within the exhaust to condense when contacting the insulating layers 34. Further, because the insulating layers 34 are apart from the catalyst carrier 14, even if the temperature of the catalyst carrier 14 is raised for example, it is difficult for the heat thereof to be transmitted to the insulating layers 34, and it is difficult for the temperatures of the insulating layers 34 to rise.

When condensation arises at the surfaces of the insulating layers 34 in this way, the insulating abilities of the insulating layers 34 deteriorate, and therefore, there is the concern that the electrode rods 32 and the case tube 28 will be short-circuited via the insulating layers 34, the electrode-mounting covers 36, and the electrode-mounting bosses 44. Consequently, when the two electrode rods 32 are short-circuited, the efficiency of supplying electricity to the catalyst carrier 14 deteriorates.

In contrast, in the catalytic converter 12 of the present embodiment, heat is generated due to high voltage being applied to the insulating layers 34 from the power supply 48, and the temperatures rise. Therefore, condensation, i.e., adhering of liquid moisture, at the surfaces of the insulating layers 34 can be suppressed. Further, even if liquid moisture does adhere to the insulating layers 34, it is possible to promote the evaporation of this moisture and eliminate it. Due thereto, in the catalytic converter 12 of the present embodiment, a deterioration in the insulating ability between the electrode rods 32, that is caused by moisture within the exhaust, can be suppressed. Further, the efficiency of supplying electricity to the catalyst carrier 14 can be maintained high.

Figure 2:
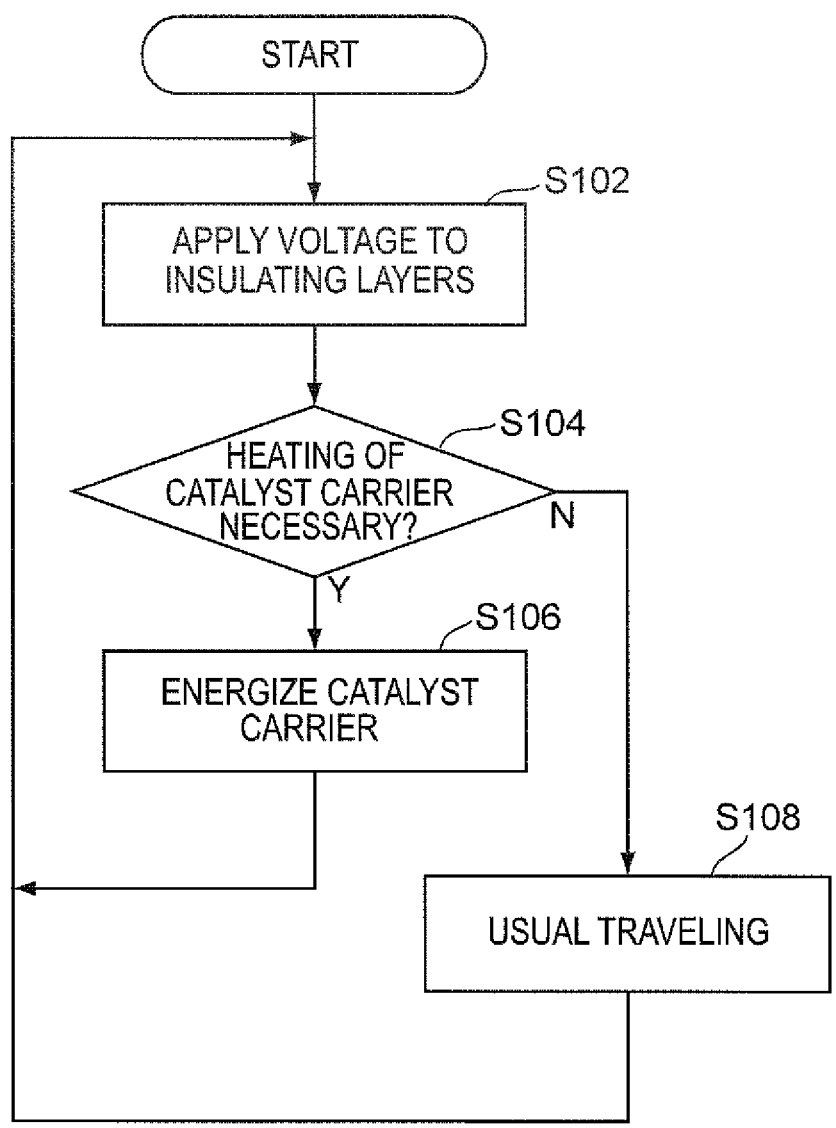
FIG. 2 is a flowchart showing an example of a flow of energizing of a catalyst carrier and voltage application to insulating layers, in the exhaust device for a vehicle of the first embodiment of the present invention.

An example of the flow (a first control flow), in a case in which voltage is applied from the power supply 48 to the insulating layers 34, is shown in FIG. 2.

Note that this flow is started due to the engine being started-up in the case of a gasoline car, and due to there becoming a "Ready on" state, that is a state in which traveling is possible, in the case of a hybrid car, hereinafter, these are collectively called "a state in which traveling is possible".

In step S102, the control device 42 applies voltage to the insulating layers 34. This application of voltage is carried out, for example, for a predetermined time that is set in advance. Due thereto, the insulating layers 34 generate heat, and the temperatures rise. Therefore, in a case in which liquid moisture has adhered to the surfaces of the insulating layers 34, that liquid moisture is evaporated. Further, new condensation at the surfaces of the insulating layers 34 also is suppressed.

Next, the routine moves on to step S104, and it is judged whether or not heating by energizing of the catalyst carrier 14 is necessary. Because the catalytic converter 12 of the present embodiment has the temperature sensor 54, this judgment can be carried out on the basis of the temperature data detected at the temperature sensor 54. Of course, this judgment may be carried out on the basis of the temperature of the exhaust instead of (or together with) the temperature data from the temperature sensor 54.

In a case in which it is judged that heating of the catalyst carrier 14 is unnecessary, the control device 52 shifts the routine to a usual traveling mode in step S108 without energizing the catalyst carrier 14, and the routine returns to step S102. In the usual traveling mode, the energizing of the catalyst carrier 14 and the application of voltage to the insulating layers 34 is stopped.

In a case in which it is judged in step S104 that heating of the catalyst carrier 14 is necessary, in step S106, the control device 52 carries out energizing of the catalyst carrier 14. This energizing as well is carried out, for example, for a predetermined time that is determined in advance.

Thereafter, the routine returns to step S102. Accordingly, application of voltage to the insulating layers 34 can be carried out continuously while the vehicle is traveling. Further, in a case in which the temperature of the catalyst carrier 14 falls while the vehicle is traveling, re-energizing of the catalyst carrier 14 can be carried out.

In this way, in the first control flow, in the state in which traveling is possible, application of voltage to the insulating layers 34 is certainly carried out, and therefore, control is easy. Further, when energizing the catalyst carrier 14, the possibility that the electrical resistances of the insulating layers 34 can be ensured to be high increases, and therefore, with respect to the energizing of the catalyst carrier 14, efficient energization is possible.

Figure 3:
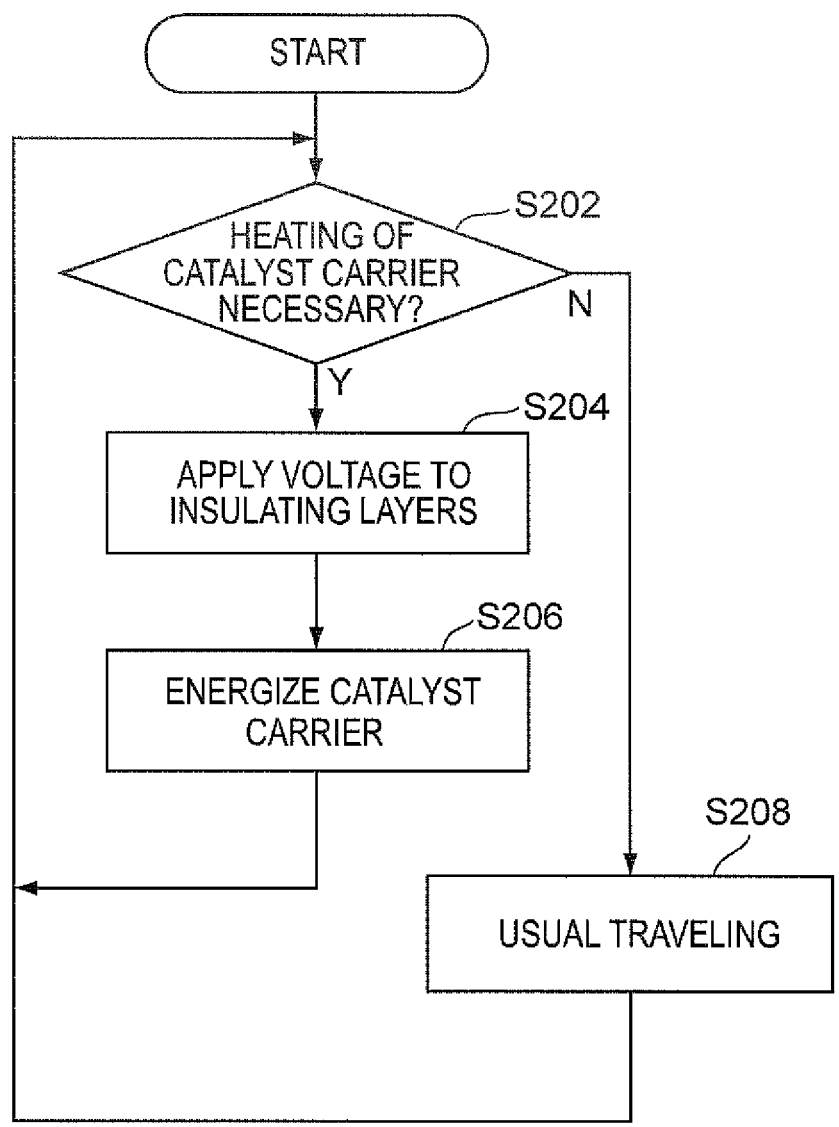
FIG. 3 is a flowchart showing an example of a flow of energizing of the catalyst carrier and voltage application to the insulating layers, in the exhaust device for a vehicle of the first embodiment of the present invention.

An example of a control flow (a second control flow) that is different than FIG. 2, in the catalytic converter 12 of the first embodiment, is shown in FIG. 3.

In the second control flow, in step S202, the control device 52 judges whether or not heating by energizing the catalyst carrier 14 is needed. In this same way as the first control flow, this judgment can be carried out on the basis of the temperature data detected at the temperature sensor 54, or on the basis of the temperature of the exhaust.

In a case in which it is judged that heating of the catalyst carrier 14 is unnecessary, the control device 52 shifts the routine to the usual traveling mode in step S208 without energizing the catalyst carrier 14, and the routine returns to step S202.

In a case in which it is judged in step S202 that heating of the catalyst carrier 14 is necessary, in step S204, the control device 52 applies voltage to the insulating layers 34. This application of voltage is carried out, for example, for a predetermined time that is set in advance. Due thereto, the insulating layers 34 generate heat, and the temperatures rise. Therefore, the liquid moisture that has adhered to the surfaces of the insulating layers 34 is evaporated (new condensation also is suppressed).

Next, the routine moves on to step S206, and energizing of the catalyst carrier 14 is carried out. Thereafter, in step S208, the routine moves on to the usual traveling mode.

Thereafter, the routine returns to step S202. Accordingly, in a case in which the temperature of the catalyst carrier 14 falls while the vehicle is traveling, voltage application to the insulating layers 34 is carried out, and thereafter, re-energization of the catalyst carrier 14 can be carried out.

In this way, in the second control flow, in a case in which it is judged that heating by energization of the catalyst carrier 14 is necessary, application of voltage to the insulating layers 34 is certainly carried out before that, and therefore, control is easy. Further, after the liquid moisture of the insulating layers 34 is evaporated, the electrode rods 32 do not short-circuit one another, and therefore, efficient energization of the catalyst carrier 14 is possible.

Moreover, in a case in which it is judged that heating by energizing the catalyst carrier 14 is unnecessary, not only energizing of the catalyst carrier 14, but also application of voltage to the insulating layers 34 is not carried out. Therefore, efficient application of voltage to the insulating members 34 and energization of the catalyst carrier 14 are possible.

Figure 4:
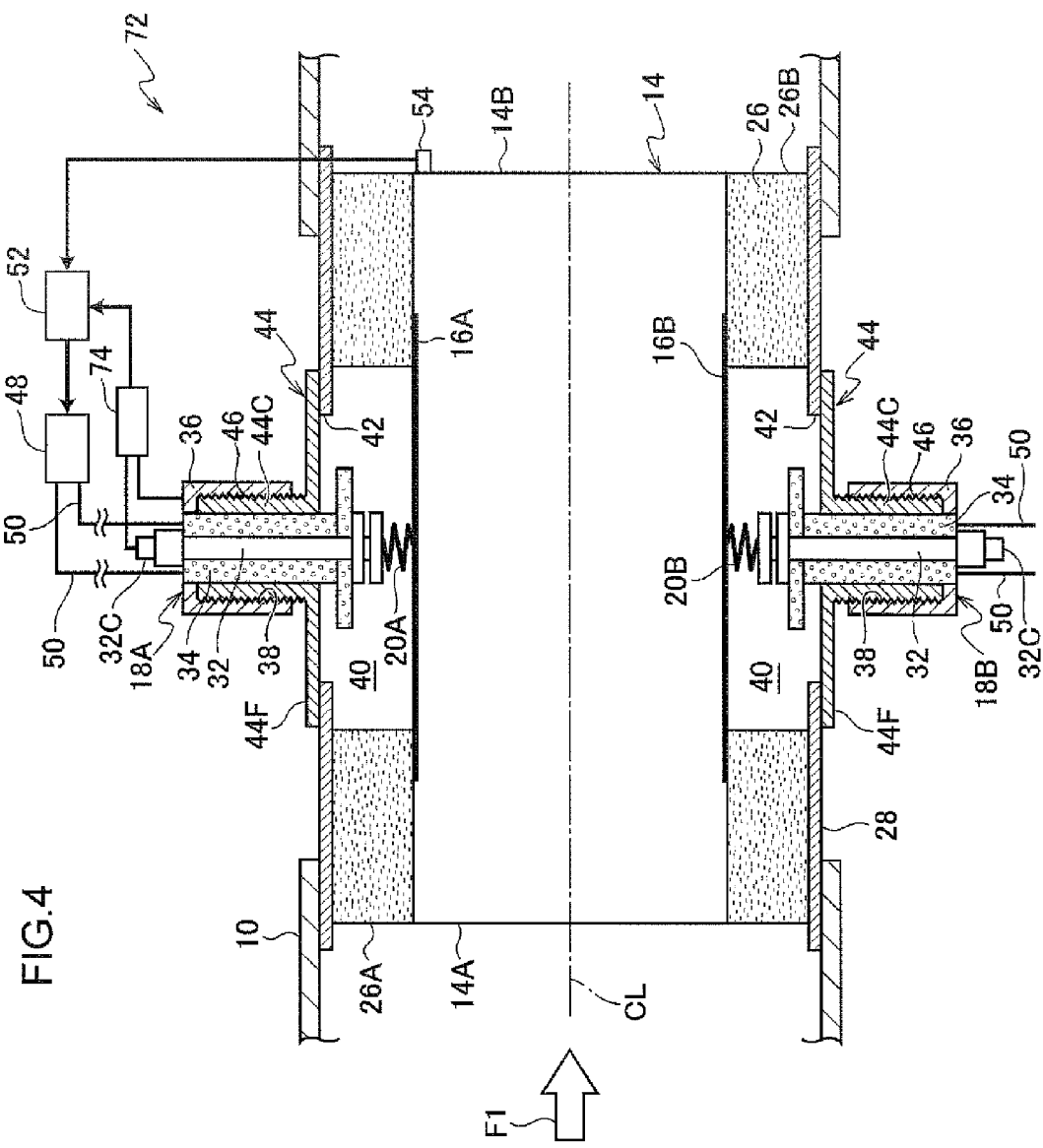
FIG. 4 is a cross-sectional view showing the schematic structure of an exhaust device for a vehicle of a second embodiment of the present invention, in a state of being mounted to an exhaust pipe, in a cross-section that includes a central line.

A catalytic converter 72 of a second embodiment of the present invention is shown in FIG. 4. In the catalytic converter 72 of the second embodiment, structural elements, members and the like that are similar to the catalytic converter 12 of the first embodiment are denoted by the same reference numerals, and detailed description thereof is omitted.

With respect to the catalytic converter 12 of the first embodiment, the catalytic converter 72 of the second embodiment additionally has a resistance meter 74 that detects the electrical resistance of the insulating layer 34. The data of the electrical resistance of the insulating layer 34, that is detected at the resistance meter 74, is sent to the control device 52. Note that, instead of directly measuring the electrical resistance of the insulating layer 34 at the resistance meter 74, for example, the electrical resistance of the insulating layer 34 may be estimated from the moisture content, the oxygen concentration, or the like of the insulating layer 34.

Figure 5:
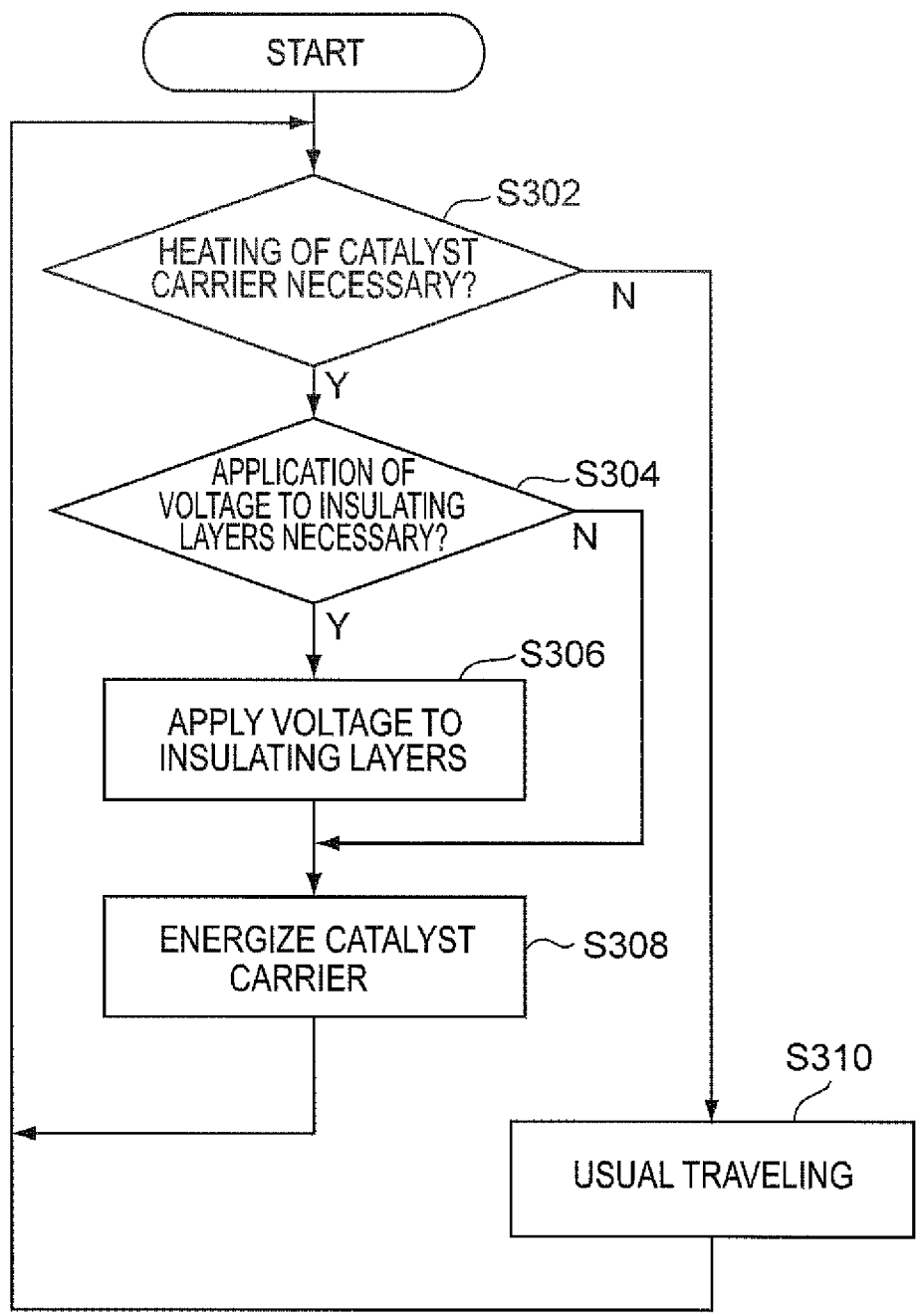
FIG. 5 is a flowchart showing an example of a flow of energizing of a catalyst carrier and voltage application to insulating layers, in the exhaust device for a vehicle of the second embodiment of the present invention.

An example of the flow (a third control flow), in a case in which voltage is applied from the power supply 48 to the insulating layers 34 at the catalytic converter 72 of the second embodiment, is shown in FIG. 5.

In this flow, in the state in which traveling is possible, in step S302, the control device 52 judges whether or not heating by energizing the catalyst carrier 14 is necessary. In the same way as the first control flow, this judgment can be carried out on the basis of the temperature data detected at the temperature sensor 54, and instead of this (or together therewith), the temperature of the exhaust may be used.

In a case in which it is judged that heating of the catalyst carrier 14 is unnecessary, the control device 52 shifts the routine to the usual traveling mode in step S310 without energizing the catalyst carrier 14, and the routine returns to step S302. Up to here is similar to the second control flow that is shown in FIG. 3.

In step S302, in a case in which it is judged that heating of the catalyst carrier 14 is necessary, the routine moves on to step S304. In step S304, it is judged whether or not application of voltage to the insulating layers 34 is necessary. This judgment can be carried out on the basis of the data of the electrical resistance of the insulating layer 34 that is detected by the resistance meter 74.

In a case in which it is judged in step S304 that application of voltage to the insulating layers 34 is unnecessary, because the insulating layers 34 have an insulating ability, the routine moves on to step S308. In step S308, energizing of the catalyst carrier 14 is carried out. Due thereto, the temperature of the catalyst itself that is carried by the catalyst carrier 14 is raised, and the purifying action can be exhibited earlier.

In a case in which it is judged in step S304 that application of voltage to the insulating layers 34 is necessary, in step S306, the control device 52 applies voltage to the insulating layers 34. This application of voltage is carried out, for example, for a predetermined time that is set in advance. Due thereto, the insulating layers 34 generate heat, and the temperatures thereof rise. Therefore, the liquid moisture that has adhered to the surfaces of the insulating layers 34 is evaporated.

Next, the routine moves on to step S308, and energizing of the catalyst carrier 14 is carried out. Thereafter, in step S310, the routine moves on to the usual traveling mode.

Thereafter, the routine returns to step S302. Accordingly, in a case in which the temperature of the catalyst carrier 14 falls while the vehicle is traveling, application of voltage to the insulating layers 34 is carried out as needed, and thereafter, re-energization of the catalyst carrier 14 can be carried out.

In this way, in the third control flow, in a state in which heating by energizing of the catalyst carrier 14 is necessary, it is judged whether or not application of voltage to the insulating layers 34 is necessary, and, in a case in which application of voltage to the insulating layers 34 is unnecessary, voltage is not applied. Therefore, excess application of voltage can be suppressed.

Further, in a case in which application of voltage to the insulating layers 34 is necessary, voltage is reliably applied before the energizing of the catalyst carrier 14. Therefore, short-circuiting between the electrode rods 32 is suppressed, and efficient energization of the catalyst carrier 14 is possible.

Figure 6:
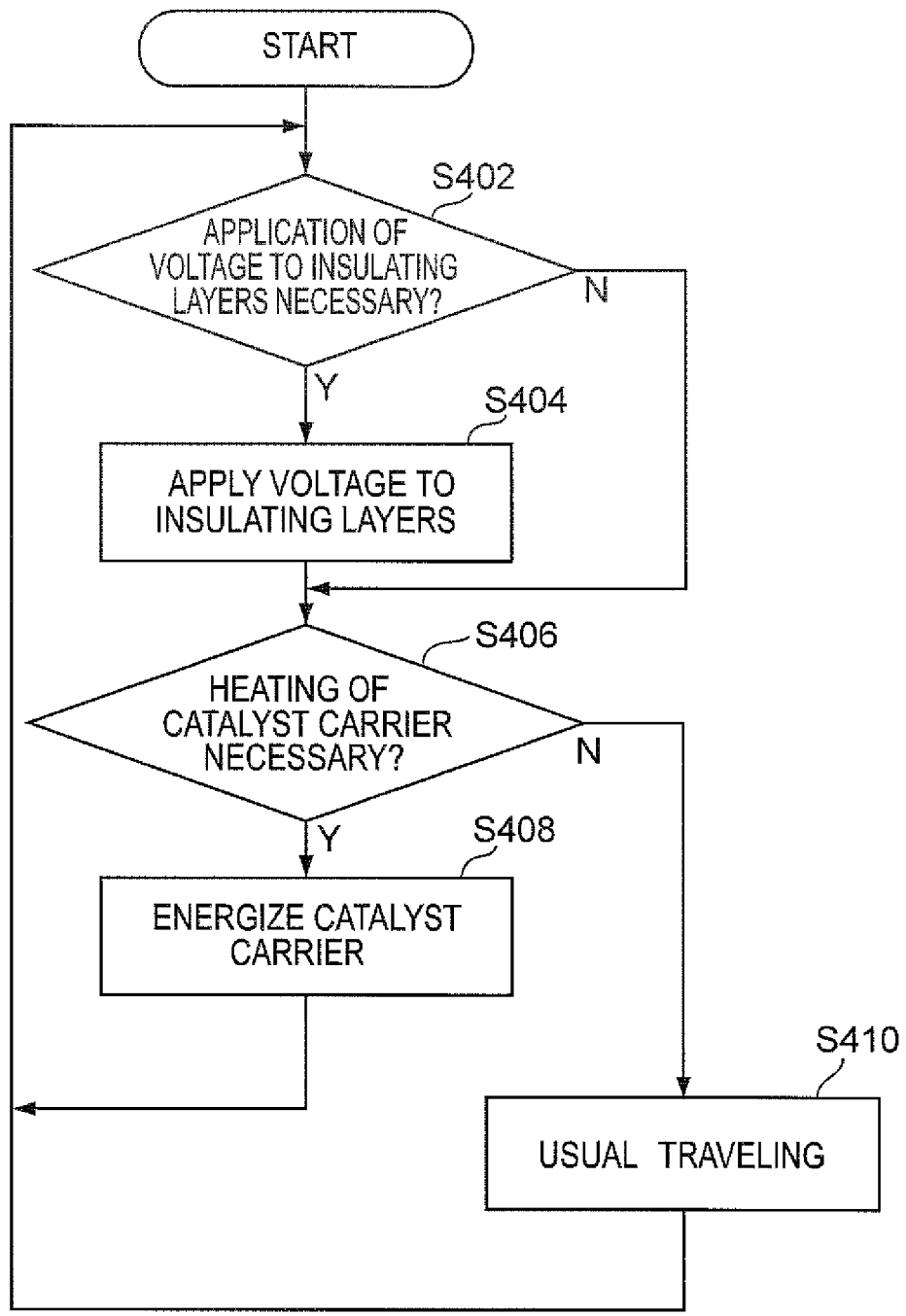
FIG. 6 is a flowchart showing an example of a flow of energizing of the catalyst carrier and voltage application to the insulating layers, in the exhaust device for a vehicle of the second embodiment of the present invention.

An example of the flow (a fourth control flow), in a case in which voltage is applied from the power supply 48 to the insulating layers 34 at the catalytic converter 72 of the second embodiment and that is different from the third control flow, is shown in FIG. 6.

In this flow, when there is a state in which traveling is possible, in step S402, the control device 52 judges whether or not application of voltage to the insulating layers 34 is necessary. This judgment can be carried out on the basis of the data of the electrical resistance of the insulating layer 34 that is detected by the resistance meter 74. In the same way as the third control flow, this judgment can be carried out on the basis of the data of the electrical resistance of the insulating layer 34 that is detected by the resistance meter 74.

In a case in which it is judged in step S402 that application of voltage to the insulating layers 34 is unnecessary, because the insulating layers 34 have an insulating ability, the routine moves on to step S406. In step S406, it is judged whether or not heating by energizing the catalyst carrier 14 is necessary. In the same way as the third control flow, this judgment can be carried out on the basis of the temperature data detected at the temperature sensor 54, and instead of this (or together therewith), the temperature of the exhaust may be used.

In a case in which it is judged in step S406 that application of voltage to the insulating layers 34 is unnecessary, the routine moves on to step S410 and moves on to the usual traveling mode, and the routine returns to step S402. In a case in which it is judged in step S406 that application of voltage to the insulating layers 34 is necessary, the routine moves on to step S408, and energizing of the catalyst carrier 14 is carried out.

Thereafter, the routine returns to step S402. Accordingly, in a case in which the temperature of the catalyst carrier 14 falls while the vehicle is traveling, application of voltage to the insulating layers 34 is carried out as needed, and thereafter, re-energization of the catalyst carrier 14 can be carried out.

In this way, in the fourth control flow as well, voltage is reliably applied before the energizing of the catalyst carrier 14. Therefore, short-circuiting between the electrode rods 32 is suppressed, and efficient energization of the catalyst carrier 14 is possible.

Figure 7:
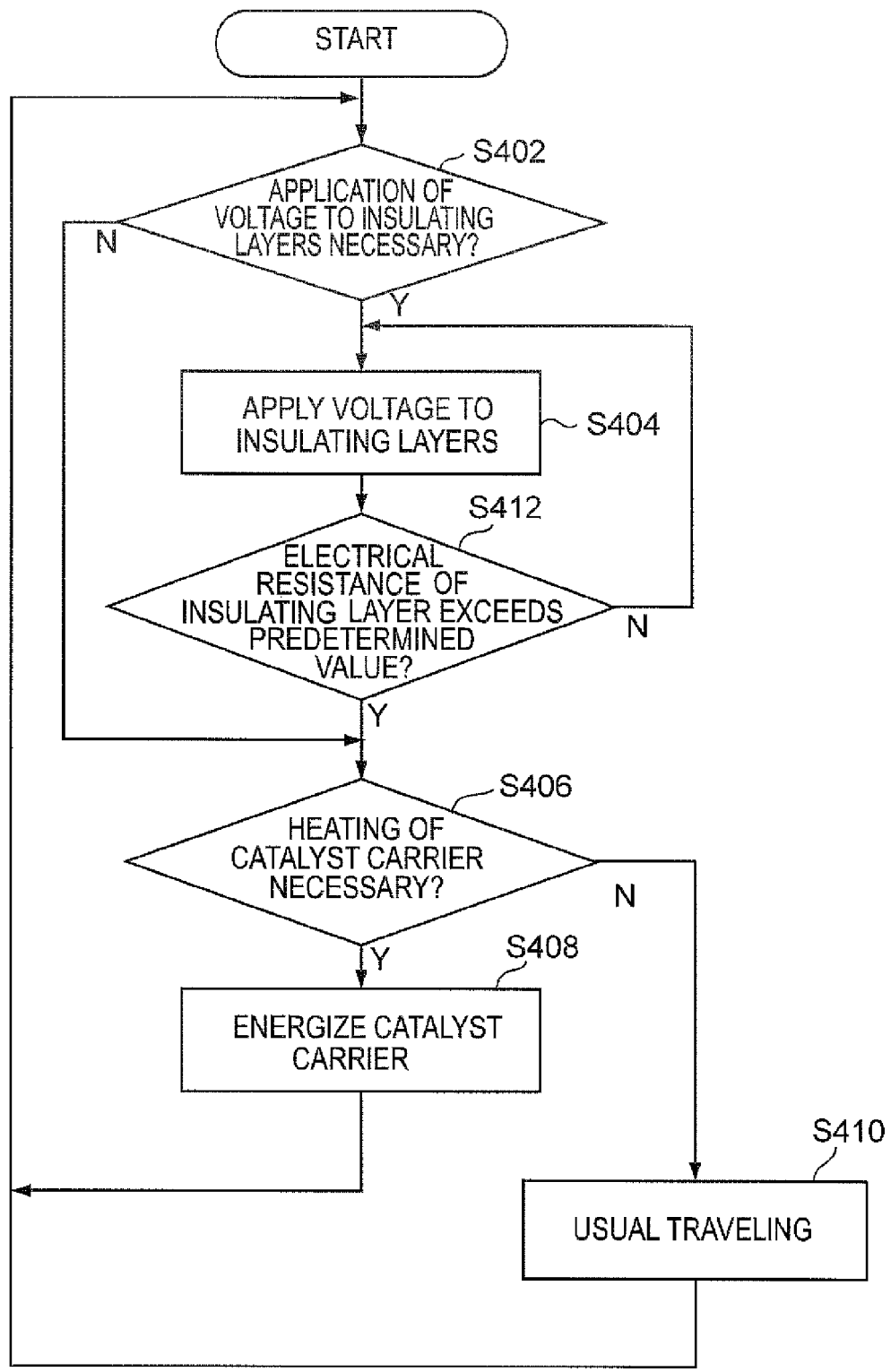
FIG. 7 is a flowchart showing an example of a flow of energizing of the catalyst carrier and voltage application to the insulating layers, in the exhaust device for a vehicle of the second embodiment of the present invention.

An example of the flow (a fifth control flow), in a case in which voltage is applied from the power supply 48 to the insulating layers 34 at the catalytic converter 72 of the second embodiment and that is different from the third control flow and the fourth control flow, is shown in FIG. 7.

In this flow, steps that are the same as the fourth control flow are denoted by the same reference numerals.

In the fifth control flow, with respect to the fourth control flow, after the application of voltage to the insulating layers 34 in step S404, in step S412, it is judged whether or not the electrical resistance of the insulating layer 34 exceeds a predetermined value. This judgment can be carried out on the basis of the data of the electrical resistance of the insulating layer 34 that is detected by the resistance meter 74.

Further, in a case in which the electrical resistance of the insulating layer 34 does not exceed a predetermined value (a resistance value that is high to the extent that it is possible to suppress short circuiting from the electrode rods 32 to the case tube 28), the routine returns to step S404, and successively, application of voltage to the insulating layers 34 is carried out. In contrast, in a case in which the electrical resistance of the insulating layer 34 exceeds the predetermined value, the routine moves on to step S406. Namely, in the fifth control flow, the ending of the application of voltage to the insulating layers 34 is not based on time, and is based on the actual electrical resistance of the insulating layer 34. Therefore, the catalyst carrier 14 can be energized in a state in which the electrical resistance of the insulating layer 34 has certainly exceeded the predetermined value.

Note that the control, that carries out the ending of the application of voltage to the insulating layers 34 in this way on the basis of the electrical resistance of the insulating layer 34 exceeding the predetermined value and not on the basis of time, may be added to the fourth control flow.

In the above description, the second embodiment gives an example of directly detecting the electrical resistance of the insulating layer 34 by the resistance meter 74. However, for example, the moisture content of the insulating layer 34 may be detected, and the application of voltage to the insulating layers 34 can be controlled on the basis of this moisture content (the electrical resistance of the insulating layer 34 can be known indirectly).

Further, in the respective flows of the second embodiment, the judgment as to whether or not application of voltage to the insulating layers 34 is necessary, and the application of voltage thereafter, may be carried out regardless of the state in which traveling is possible. Due thereto, condensation of the insulating layers 34 is always suppressed, and a state in which the electrical resistances are high can be maintained. Therefore, efficient energization to the catalyst carrier 14 is possible from immediately after there becomes a state in which traveling is possible.

In all of the structures, voltage is applied to the insulating layers 34 before the energizing of the catalyst carrier 14. If, opposite thereto, voltage is applied to the insulating layers 34 after the energizing of the catalyst carrier 14, there is the concern that the catalyst carrier 14 will be energized before the liquid moisture that has adhered to the insulating layers 34 is evaporated, i.e., in a state in which the electrical resistances of the insulating layers 34 have decreased. In contrast, by the methods of the respective control flows, the catalyst carrier 14 is energized in a state in which the liquid moisture that has adhered to the insulating layers 34 has been reduced (and preferably, completely evaporated) and the electrical resistances have been increased. Accordingly, a deterioration in the efficiency of supplying electricity to the catalyst carrier 14 can be suppressed.

Note that, even in a structure in which voltage is applied to the insulating layers 34 simultaneously with the energizing of the catalyst carrier 14, there is a high possibility that the efficiency of supplying electricity to the catalyst carrier 14 is high, as compared with a structure in which voltage is applied to the insulating layers 34 after energization of the catalyst carrier 14. However, the application of voltage to the insulating layers 34 before the energizing of the catalyst carrier 14 is preferable from the standpoint of more reliably suppressing a decrease in the efficiency of supplying electricity to the catalyst carrier 14.

The above-described respective flows are ended at a point in time when the possibility of vehicle traveling no longer exists, at an arbitrary step, e.g., the stoppage of the engine, the turning off of the ignition key, or the like.

In the above-described respective embodiments, the temperature sensor 54 may be omitted, and the temperature of the catalyst carrier 14 may be estimated from, for example, the temperature of the exhaust. Or, because it is thought that, immediately after start-up of the engine, generally, the temperature of the exhaust is low and the temperature of the catalyst carrier 14 as well is low, control to energize the catalyst carrier 14 may be carried out for a fixed time after engine start-up.

As the power supply 48, the battery (e.g., a voltage of around 12V) that is generally installed in a vehicle can be used. However, in the case of a hybrid car in particular, it is possible to make it such that a higher voltage can be applied to the insulating layers 34 by using the battery for driving (e.g., a voltage of around 500 V) that supplies the electric power for driving of the vehicle.

As the insulating members of the present invention as well, the insulating layers 34, that are disposed at the peripheries of the electrode rods 32 (electrode members), are given as an example in the above description, but, to sum up, it suffices to be able to electrically insulate the electrode rods 32 from the case tube 28, and, for example, insulating members may be provided between the electrode-mounting bosses 44 and the case tube 28. Moreover, insulating members do not have to be provided so as to correspond to both of the two electrode rods 32, and, even if provided so as to correspond to only one of the electrode rods 32, the electrode rods 32 electrically short-circuiting one another via the case tube 28 can be suppressed. When insulating members are provided in correspondence with both of the two electrode rods 32, the insulating effect can be maintained more reliably.

Moreover, in addition to the electrode rods 32, the electrode plates 16A, 16B or the conductor members 20A, 20B also can be included as the electrode members of the present invention. In this case, it suffices to dispose the insulating member relating to the present invention between the electrode plate 16A, 16B or the conductor member 20A, 20B, and the case tube 28.

The invention claimed is:

1. A catalytic converter comprising:
    a case tube that is mounted to an exhaust pipe and through an interior of which exhaust flows;
    a catalyst carrier that is provided at the case tube, that carries a catalyst for purifying exhaust that is exhausted from an engine, and that is heated by energization;
    a pair of electrode members that pass through the case tube, are made to contact the catalyst carrier, and are for energizing the catalyst carrier;
    an insulating member that is disposed between the case tube and at least one of the electrode members, that insulates the electrode member from the case tube, and that generates heat due to application of voltage;
    a control device that controls energizing of the catalyst carrier and application of voltage to the insulating member; and
    lead lines that are directly connected to the insulating member and that apply voltage to the insulating member.

2. The catalytic converter of claim 1, wherein the control device applies voltage to the insulating member before energizing of the catalyst carrier.

3. The catalytic converter of claim 1, comprising:
    a temperature detecting device for detecting a temperature of the catalyst carrier,
    wherein the control device carries out application of voltage to the insulating member and energizing of the catalyst carrier, in a case in which the temperature of the catalyst carrier detected by the temperature detecting device is less than or equal to a predetermined temperature.

4. The catalytic converter of claim 3, wherein the control device carries out energizing of the catalyst carrier in a case in which the electrical resistance of the insulating member exceeds a predetermined value.

5. The catalytic converter of claim 3, comprising:
    a temperature detecting device for detecting a temperature of the catalyst carrier,
    wherein, in a case in which the electrical resistance of the insulating member is less than or equal to a predetermined value, the control device carries out application of voltage to the insulating member, and, after the electrical resistance exceeds the predetermined value, the control device carries out energizing of the catalyst carrier in a case in which the temperature of the catalyst carrier detected by the temperature detecting device is less than or equal to a predetermined temperature.

6. The catalytic converter of claim 1, comprising:

an electrical resistance detecting device for detecting electrical resistance of the insulating member, wherein the control device applies voltage to the insulating member, in a case in which the electrical resistance of the insulating member detected by the electrical resistance detecting device is less than or equal to a predetermined value.

* * * * *